United States Patent
Hongu et al.

(10) Patent No.: US 9,160,916 B2
(45) Date of Patent: Oct. 13, 2015

(54) FOCUS ADJUSTMENT APPARATUS WITH A SIZE DETECTOR

(71) Applicant: CANON KABUSHIKI KAISHA, Tokyo (JP)

(72) Inventors: Hideyasu Hongu, Yokohama (JP); Makoto Yokozeki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 13/649,380

(22) Filed: Oct. 11, 2012

(65) Prior Publication Data

US 2013/0093943 A1 Apr. 18, 2013

(30) Foreign Application Priority Data

Oct. 16, 2011 (JP) .................................. 2011-227515
Oct. 23, 2011 (JP) .................................. 2011-232334
Oct. 23, 2011 (JP) .................................. 2011-232335

(51) Int. Cl.
*H04N 5/232* (2006.01)

(52) U.S. Cl.
CPC ....... *H04N 5/23212* (2013.01); *H04N 5/23219* (2013.01)

(58) Field of Classification Search
CPC . H04N 5/23212; H04N 5/23219; G03B 13/36
USPC ................. 348/352, 345, 349, 353, 354, 356; 396/104
See application file for complete search history.

(56) References Cited

U.S. PATENT DOCUMENTS

| 8,107,806 | B2 * | 1/2012 | Uenishi .......................... 348/352 |
| 8,269,879 | B2 * | 9/2012 | Sugimoto ...................... 348/349 |
| 8,274,596 | B2 * | 9/2012 | Pincenti et al. ............... 348/349 |
| 8,279,324 | B2 * | 10/2012 | Yasuda .......................... 348/345 |
| 8,289,439 | B2 * | 10/2012 | Yasuda .......................... 348/349 |
| 8,330,849 | B2 * | 12/2012 | Ishii .............................. 348/345 |
| 8,421,905 | B2 * | 4/2013 | Sugimoto ...................... 348/349 |
| 8,471,951 | B2 * | 6/2013 | Yasuda .......................... 348/349 |
| 8,502,912 | B2 * | 8/2013 | Kawanishi .................... 348/345 |
| 2009/0009651 | A1 * | 1/2009 | Takayanagi ................... 348/345 |
| 2009/0135291 | A1 * | 5/2009 | Sugimoto ...................... 348/347 |
| 2009/0256953 | A1 * | 10/2009 | Yasuda .......................... 348/349 |
| 2010/0013981 | A1 * | 1/2010 | Yasuda .......................... 348/345 |
| 2010/0060780 | A1 * | 3/2010 | Shibagami et al. ........... 348/345 |
| 2010/0329565 | A1 * | 12/2010 | Kunieda ........................ 382/190 |

(Continued)

FOREIGN PATENT DOCUMENTS

| JP | H08-005896 A | 1/1996 |
| JP | 2004-077960 A | 3/2004 |
| JP | 2005-156971 A | 6/2005 |
| JP | 2006-018246 A | 1/2006 |

(Continued)

*Primary Examiner* — John Villecco
(74) *Attorney, Agent, or Firm* — Canon USA Inc IP Division

(57) ABSTRACT

In a focus position control apparatus, a control unit performs, when a size changing amount of an object image is larger than a predetermined amount during control for driving a focus lens according to a distance change of an object image in an optical axis direction based on a determination result of a determination unit, a following driving operation corresponding to the distance change as a driving control, and limits the following driving operation corresponding to the distance change when the size changing amount of the object image smaller than the predetermined amount. The predetermined amount is changed according to an imaging parameter and an object status.

13 Claims, 13 Drawing Sheets

(56) References Cited

U.S. PATENT DOCUMENTS

| | | | |
|---|---|---|---|
| 2011/0044675 A1* | 2/2011 | Uenishi | 396/95 |
| 2011/0228162 A1* | 9/2011 | Ogino | 348/345 |
| 2012/0147255 A1* | 6/2012 | Yasuda | 348/352 |
| 2012/0182462 A1* | 7/2012 | Hamada | 348/352 |
| 2012/0236198 A1* | 9/2012 | Hamada | 348/352 |
| 2013/0258169 A1* | 10/2013 | Yasuda | 348/349 |

FOREIGN PATENT DOCUMENTS

| | | |
|---|---|---|
| JP | 2007-264049 A | 10/2007 |
| JP | 2008-276214 A | 11/2008 |
| JP | 2009-31760 A | 2/2009 |
| JP | 2009-133903 A | 6/2009 |
| JP | 2009-139688 A | 6/2009 |
| JP | 2009-251464 A | 10/2009 |

* cited by examiner

FIG.12

| IMAGING MODE (INCLUDING SCENE RECOGNITION) | CORRECTION COEFFICIENT K''' |
|---|---|
| NIGHTSCAPE / SNOW / BEACH / SUNSET / SPOTLIGHT / FIREWORKS | 1.5 |
| NORMAL MODE / STATIC HUMAN RECOGNITION | 1.0 |
| PORTRAIT | 0.9 |
| SPORTS MODE / WORKING HUMAN RECOGNITION | 0.8 |

FACE DETECTION FRAME

CASE WHERE FACE IS DIRECTED FRONT

CASE WHERE FACE IS TURNED AWAY (OBLIQUE)

FOCUS ADJUSTMENT APPARATUS WITH A SIZE DETECTOR

BACKGROUND OF THE INVENTION

1. Field of the Invention

The present invention relates to an automatic focus adjustment apparatus and an automatic focus adjustment method in an imaging apparatus that extracts, when an imaging target includes a predetermined object such as a human, a feature portion (face or the like) of the human, and adjusts a focus in consideration of its result.

2. Description of the Related Art

In autofocus (AF) control for automatically adjusting a focus of a video camera, the following television (TV)-AF method is normally used. That is, an AF evaluation value signal indicating sharpness (contrast state) of a video signal generated by photoelectrically converting light from an object by using an image sensor is generated, and a position of a focus lens where the AF evaluation value signal is largest is searched for.

However, in the imaging apparatus that has a face detection function, when a human is image-captured, a contrast of a human face is generally low, and therefore it is difficult to acquire a sufficient AF evaluation value. Consequently, when a distance from the object changes, identification of a focusing direction is difficult by a change of the AF evaluation value. This disables a lens position from following the object, thus causing blurring of an object image.

To solve such a problem, there has been offered a method for comparing detected face sizes with each other, determining that the object has moved in a near or far direction when the face size has increased or decreased, and driving the focus lens to follow the object (as discussed in Japanese Patent Applications Laid-Open Nos. 2009-31760 and 2008-276214).

However, in the auto-focusing the face detection, no consideration is given to an imaging parameter such as a depth of field or a state of the object, and thus the following problem may occur. That is, because of difference in size of the detected individual faces or depending on setting of a parameter during imaging, a direction of the distance change of the object may be erroneously determined, or unnecessary movement determination may be made even when the object is not blurred, thus causing reduction of autofocus accuracy.

SUMMARY OF THE INVENTION

The present invention is directed to an automatic focus adjustment apparatus and an automatic focus adjustment method that can improve AF stability and accuracy by executing an AF operation for a human object based on a TV-AF method during moving image capturing, and determining a distance change in consideration of an imaging parameter or an object state when the distance change of the object occurs.

According to an aspect of the present invention, a focus position control apparatus includes: a first detection unit configured to detect a changing amount of a detected size of an object image; a second detection unit configured to detect a changing amount of the detected size of the object image; and a controller configured to switch first control and second control based on a detection result of the changing amount of the size of the object image detected by the second detection unit when the changing amount of the size of the object image detected by the first detection unit is a first case. In this case, in the first control is for controlling a focus position corresponding to a change in size of the object image, and the second control is for wobbling the focus position.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates a correction coefficient K' based on an imaging mode according to an exemplary embodiment of the present invention.

DESCRIPTION OF THE EMBODIMENTS

Various exemplary embodiments, features, and aspects of the invention will be described in detail below with reference to the drawings.

A feature of the present invention concerning automatic focus adjustment is that whether a changing amount of a size of an image of a predetermined object (human face or the like) is larger than a predetermined amount is determined, and a focus is adjusted by limiting a following driving operation corresponding to a distance change of the object image in an axial direction when the changing amount thereof is smaller than the predetermined amount, and by executing the following driving operation corresponding to the distance change of the object image in an axial direction as driving control of a focus lens when the changing amount thereof is larger than the predetermined amount.

Figure 1:
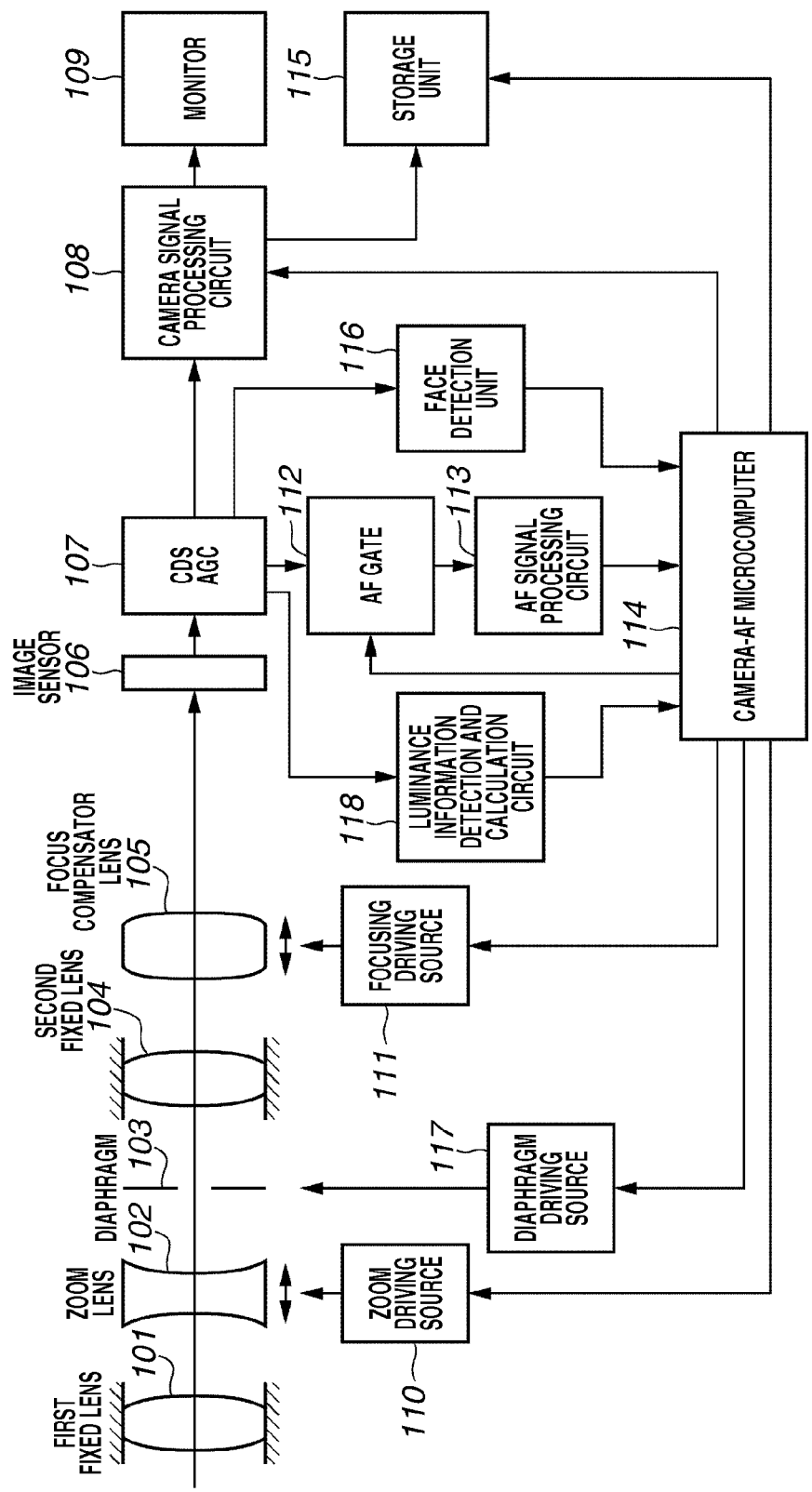
FIG. 1 is a block diagram illustrating a configuration of a video camera according to an exemplary embodiment of the present invention.

Hereinafter, an exemplary embodiment of the present invention will be described. FIG. 1 illustrates a configuration of a video camera (imaging apparatus) that includes an automatic focus adjustment apparatus according to the present exemplary embodiment. As an example of the imaging apparatus, a video camera is used in the present exemplary embodiment. However, the present invention can be applied to other imaging apparatus such as a digital still camera.

In FIG. 1, the video camera includes a first fixed lens 101, a zoom lens 102 moved in an optical axis direction to execute zooming, a diaphragm 103, a second fixed lens 104, and a focus compensator lens (hereinafter, also referred to as a focus lens) 105 that has a function of correcting movement of a focal plane accompanying the zooming, and a focusing function. The first focus lens 101, the zoom lens 102, the diaphragm 103, the second fixed lens 104, and the focus lens 105 constitute an imaging optical system for forming an image with light from an object.

An image sensor 106 is a photoelectric conversion element that includes a charge-coupled device (CCD) sensor or a complementary metal-oxide semiconductor (CMOS) sensor. The image sensor 106 photoelectrically converts the image-formed light into an electric signal. A correlated double sampling (CDS)-automatic gain control (AGC) circuit 107 performs sampling an output from the image sensor 106 to adjust a gain. A camera signal processing circuit 108 executes various kinds of image processing on an output signal from the CDS-AGC circuit 107 to generate a video signal. A monitor 109, which includes a liquid crystal display (LCD), displays the video signal output from the camera signal processing circuit 108. A storage unit 115 stores the video signal from the camera signal processing circuit 108 in a storage medium such as a magnetic tape, an optical disk, or a semiconductor memory.

A zoom driving source 110 moves the zoom lens 102. A focusing driving source 111 moves the focus lens 105. Each of the zoom driving source 110 and the focusing driving source 111 includes an actuator such as a stepping motor, a direct-current (DC) motor, a vibration-type motor, or a voice coil motor.

An AF gate 112 allows passage of, among output signals of all pixels from the CDS-AGC circuit 107, only a signal of an area (focus detection area) used for focus detection. An AF signal processing circuit 113 extracts a high-frequency component from the signal passed through the AF gate 112 to generate an AF evaluation value. In other words, the AF signal processing circuit 113 constitutes a generation unit that generates the AF evaluation value from the focus detection area set for the video signal of the electric signal. The AF evaluation value is output to a camera-AF microcomputer 114 (i.e., a control unit).

The AF evaluation value indicates sharpness (contrast state) of a video signal generated based on the output signal from the image sensor 106. However, since the sharpness changes according to a focus state (focusing level) of the imaging optical system, the AF evaluation value is a signal indicating the focus state of the imaging optical system. The camera-AF microcomputer 114 as the control unit controls the entire operation of the video camera, and carries out AF control in such a manner that the focusing driving source 111 is controlled based on the AF evaluation value and the focus lens 105 is moved to adjust a focus.

A face detection unit 116 according to the present exemplary embodiment executes known face detection processing for the image signal to detect a face area of the human within an image-capturing screen. In other words, the face detection unit 116 constitutes a detection unit that detects a predetermined object (face in this case) from the electric signal. A detection result is transmitted to the camera-AF microcomputer 114.

The camera-AF microcomputer 114 transmits information to the AF gate 112 to set a focus detection area in a position including the face area within the image-capturing screen based on the detection result. For the face detection processing, there are a method for extracting a skin color area from a gradation color of each pixel indicated by image data and detecting a face based on a degree of matching with a face profile plate prepared beforehand, and a method for extracting feature points of a face such as an eye, a nose, or a mouth by using a known pattern recognition technology to detect the face.

Figure 13:
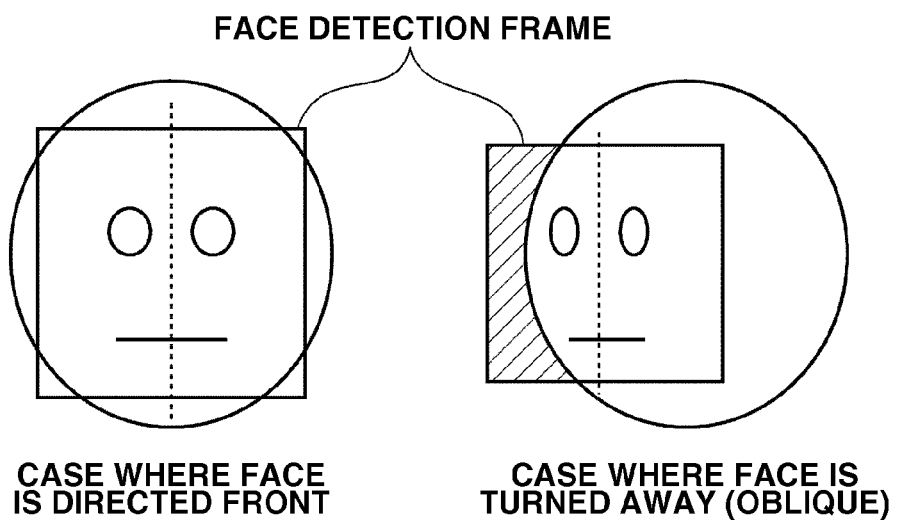
FIG. 13 illustrates a method for calculating reliability indicating a side face according to an exemplary embodiment of the present invention.

Further, the face detection unit 116 calculates reliability of the face and reliability of a side face. The reliability of the face is calculated based on, for example, the degree of matching with the face profile plate, and the degrees of matching are represented by five grades in high order. For calculation of reliability indicating side face likelihood, as illustrated in FIG. 13, an area is extracted so that a face detection frame can be divided into left and right with a center position (dotted line in FIG. 13) of both eyes of the detected face as a reference.

Then, the face detection unit 116 extracts skin color areas included in the left and right areas, and counts the numbers of pixels of the skin color areas to calculate an area. The face detection unit 116 calculates the reliability indicating the side face likelihood by using a ratio of the skin color areas included in the left and right screens. When the ratios of the left and right skin color areas are equal, it is determined that a possibility of the side face is low, and reliability indicating the side face likelihood is set low. When the ratios are greatly different, it is determined that a possibility of the side face is high, and reliability indicating the side face likelihood is set high. In the present exemplary embodiment, five grades of reliability are set according to such ratios.

A diaphragm driving source 117 includes an actuator for driving the diaphragm 103 and its driver. To acquire a luminance value of a photometric frame within the screen from a signal read by the CDS-AGC circuit 107, a luminance information detection and calculation circuit 118 acquires a photometric value, and normalizes the acquired photometric value by calculation. Then, the camera-AF microcomputer 114 calculates a difference between the photometric value and a target value set to acquire appropriate exposure. Then, the camera-AF microcomputer 114 calculates a diaphragm correction driving amount from the calculated difference, and controls driving of the diaphragm driving source 117.

Figure 2:
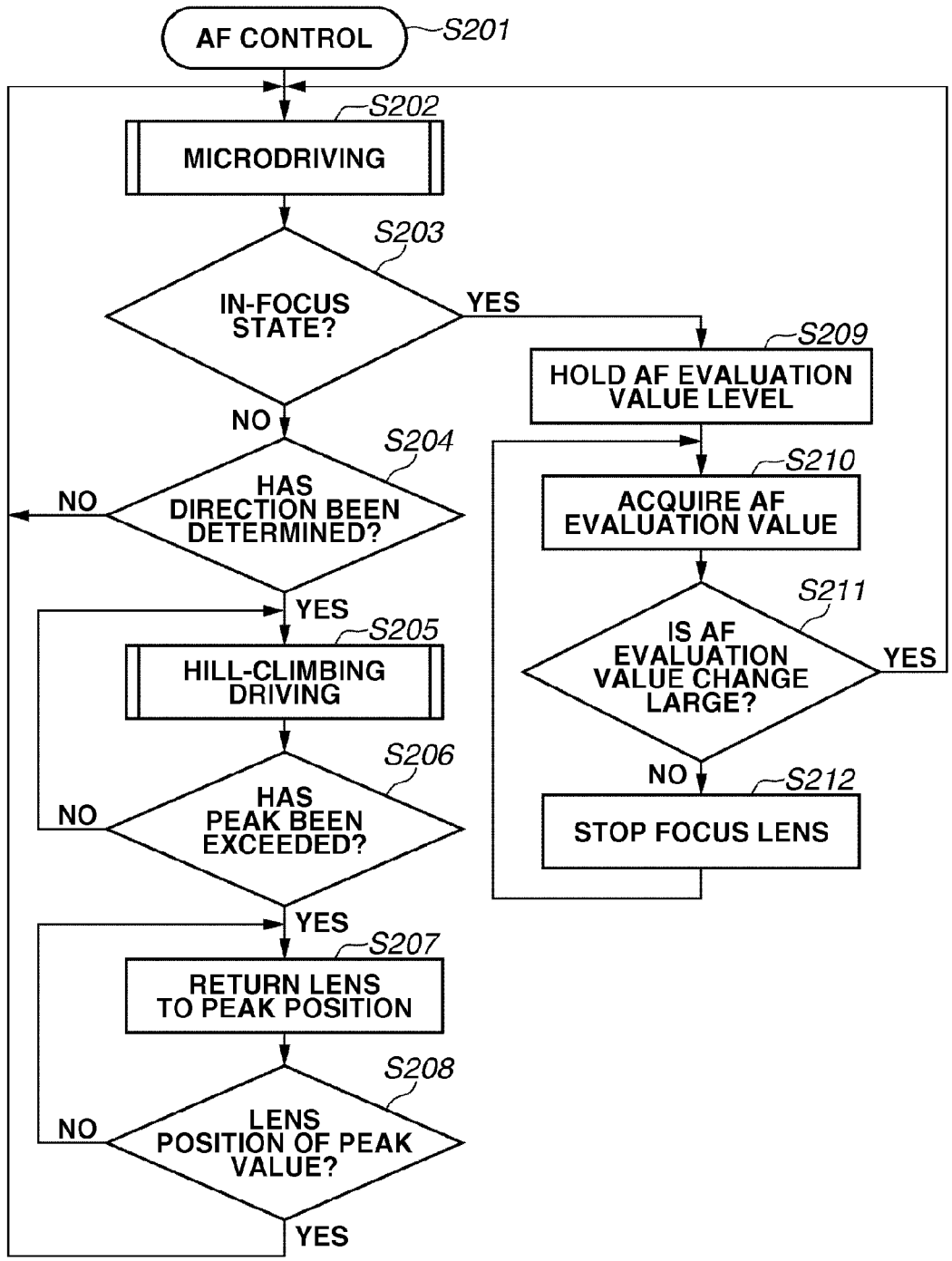
FIG. 2 is a flowchart illustrating processing executed by a camera-AF microcomputer according to an exemplary embodiment of the present invention.

Next, referring to FIG. 2, the AF control carried out by the camera-AF microcomputer 114 will be described. This AF control is carried out according to a computer program stored in the camera-AF microcomputer 114.

In step S201, the camera-AF microcomputer 114 starts processing. In step S202, the camera-AF microcomputer 114 performs a microdriving operation to determine whether the camera is in an in-focus state. When not in the in-focus state, the camera-AF microcomputer 114 determines which direction a focusing point is located in. The operation will be described in detail below. When the focusing state is determined to be in the in-focus state (YES in step S203), the processing proceeds to step S209 to execute focusing. When the focusing state is not determined to be in the in-focus state (NO in step S203), the processing proceeds to step S204.

When the direction has been detected (YES in step S204), the processing proceeds to step S205 to execute a hill-climbing driving operation. When no direction has been detected (NO in step S204), the processing returns to step S202 to continue the microdriving operation. In step S205, the camera-AF microcomputer 114 executes hill-climbing driving to drive the lens in a direction corresponding to a larger AF evaluation value at a high speed. The operation will be described in detail below.

When it is determined that a peak of the AF evaluation value has been exceeded (YES in step S206), the processing proceeds to step S207. When it is not determined that the peak of the AF evaluation value has been exceeded (NO in step S206), the processing returns to step S205 to continue the hill-climbing driving. In step S207, the camera-AF microcomputer 114 returns the lens to a lens position where the AF evaluation value during the hill-climbing driving has reached its peak.

When it is determined that the lens has returned to the lens position of the peak value (YES in step S208), the processing returns to step S202 to execute microdriving again. When it is not determined that the lens has returned to the lens position of the peak value (NO in step S208), the processing returns to step S207 to continue the operation of returning the lens to the lens position of the peak value.

Next, a focusing operation from step S209 will be described. In step S209, the camera-AF microcomputer 114 holds the AF evaluation value. In step S210, the camera-AF microcomputer 114 acquires a latest AF evaluation value. In step S211, the camera-AF microcomputer 114 compares the latest AF evaluation value acquired in step S210 with the AF evaluation value held in step 209. When it is determined that a difference is equal to or more than a predetermined level (YES in step S211), it is determined to restart the operation, and the processing returns to step S202 to resume the microdriving. When it is not determined to restart the operation (NO in step S211), the processing proceeds to step S212. In step S212, the camera-AF microcomputer 114 stops driving the lens, and then the processing returns to step S210 to continue the restarting determination.

Figure 7:
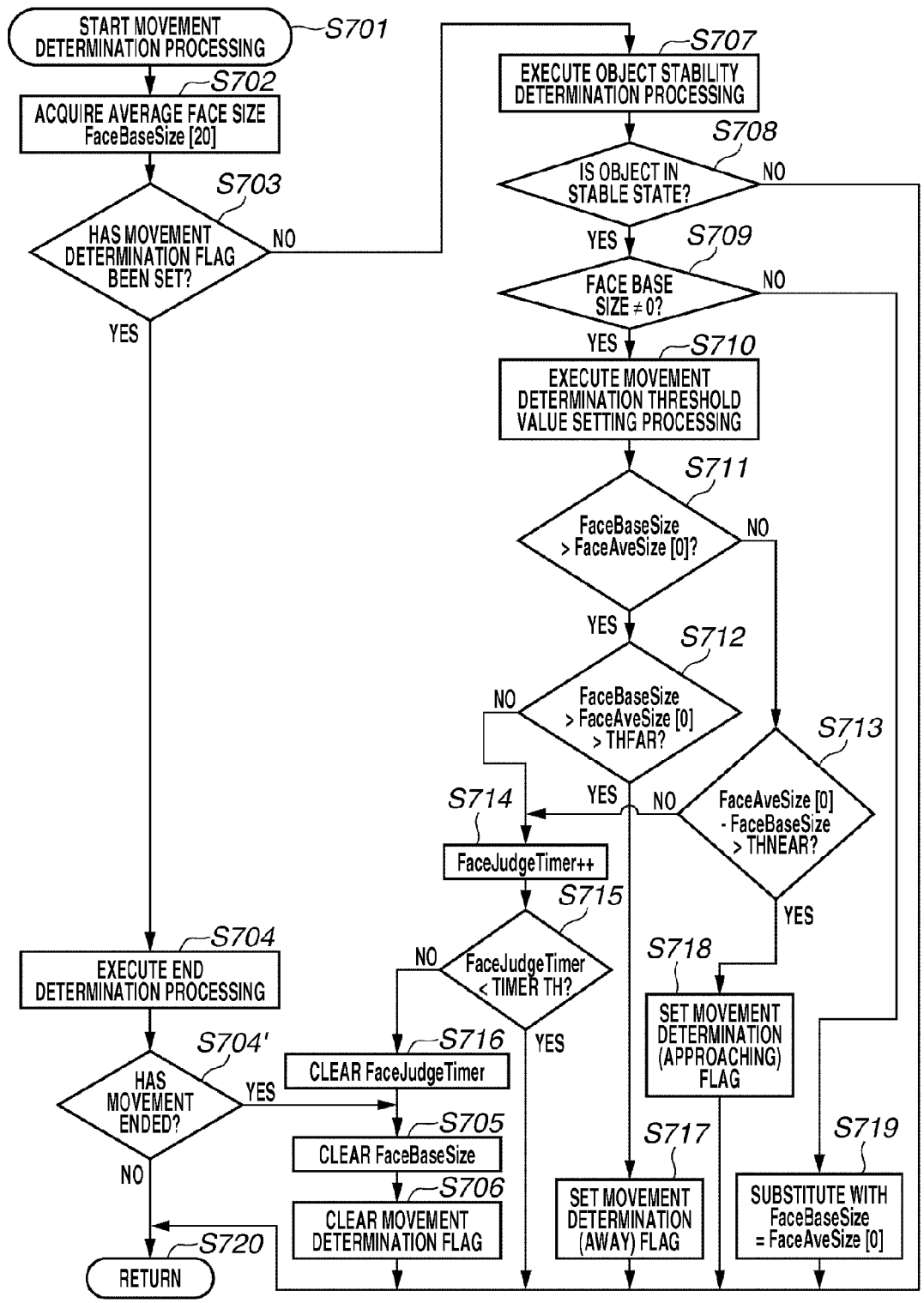
FIG. 7 is a flowchart illustrating movement determination processing according to an exemplary embodiment of the present invention.

Next, referring to FIG. 3, the microdriving operation will be described. In step S301, the camera-AF microcomputer 114 starts processing. In step S302, the camera-AF microcomputer 114 acquires a latest face detection position and size, sets an AF frame as a focus detection area based on the information, and acquires an AF evaluation value. In step S303, the camera-AF microcomputer 114 carries out processing to determine movement of the object based on the acquired face size. Referring to FIG. 7, this processing will be described below.

In step S304, the camera-AF microcomputer 114 determines whether the object has moved (in a near direction or a far direction). The processing proceeds to step S305 when it is determined that the object has moved (YES in step S304). The processing proceeds to step S306 when it is determined that the object has not moved (NO in step S304). In the present exemplary embodiment, a size of the object image for monitoring a changing amount is an image size of a human face (or other portions of the body) acquired by the face detection unit 116 as a detection unit.

Accordingly, as described below, the camera-AF microcomputer 114 determines that there is no change in distance of the object when the changing amount is within the predetermined amount, and that there is a change in distance of the object when the changing amount is larger than the predetermined amount. Then, the camera-AF microcomputer 114 limits the following control of the following control unit to adjust a focus when there is no change in distance of the object, and permits the following control of the following control unit to adjust the focus when there is a change in distance of the object. This switching is carried out in step S304.

In step S305, the camera-AF microcomputer 114 determines whether a result of the movement determination is "approaching". When the movement determination is "approaching" (YES in step S305), the processing proceeds to step S314 to determine to perform hill-climbing in a near direction. Then, in step S313, the processing is ended. Otherwise (NO in step S305), the processing proceeds to step S315 to determine to perform hill-climbing in a far direction. Then, in step S313, the processing is ended.

Driving for switching a hill-climbing direction according to a moving direction of the object is following driving or following control of the object. By executing the following driving, AF responsiveness and accuracy are improved. To execute this function, the camera-AF microcomputer 114 as the control unit includes a determination unit that determines presence of a distance change of the object based on the detection result of the face detection unit 116 as the detection unit, and a following control unit that causes the focus lens to follow the distance change of the object according to the determination result.

Accordingly, the determination unit determines "approaching" of the object when the changing amount of the size of the object image has increased more than the predetermined amount, and the control unit drives the focus lens to the near side to follow the object. On the other hand, the determination unit determines moving-away of the object when the decreasing amount of the size of the object image has been larger than the predetermined amount, and the control unit drives the focus lens to the far side to follow the object.

In the present exemplary embodiment, when the changing amount of the size of the object image detected by the detection unit is larger than the predetermined amount, the control unit executes a hill-climbing driving operation of the focus lens corresponding to the distance change of the object image in the optical axis direction. When the changing amount of the size of the object image detected by the detection unit is smaller than the predetermined amount, the control unit executes a microdriving operation of the focus lens.

Then, when the AF evaluation value acquired in step S302 is larger than a previous AF evaluation value (YES in step S306), the processing proceeds to step S307. When the AF evaluation value acquired in step S302 is smaller than the previous AF evaluation value (NO in step S306), the processing proceeds to step S308. In step S307, the camera-AF microcomputer 114 drives the focus lens by a predetermined amount in a forward direction. On the other hand, in step S308, the camera-AF microcomputer 114 drives the focus lens by a predetermined amount in a backward direction.

Figure 4:
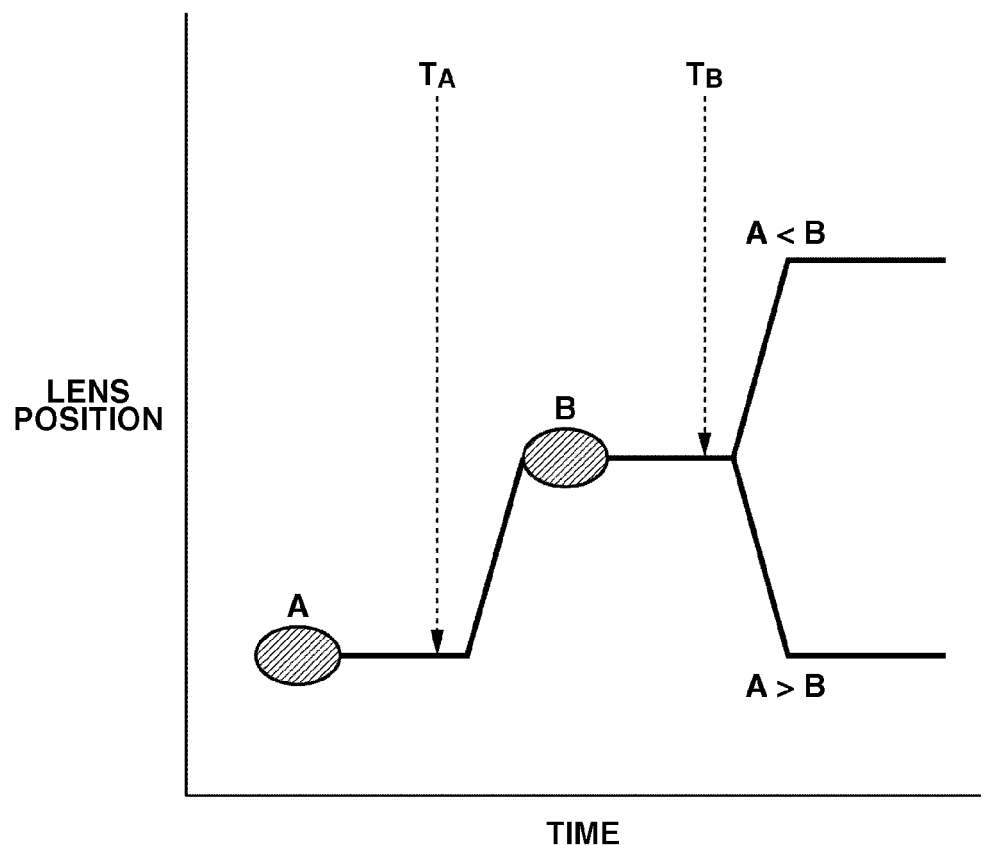
FIG. 4 illustrates the microdriving operation according to an exemplary embodiment of the present invention.

FIG. 4 illustrates the lens operation over time. During an "A" period, an AF evaluation value "A" for charges stored in the CCD (image sensor) is captured at a timing $T_A$. During a "B" period, an AF evaluation value "B" for the charges stored in the CCD is captured at a timing $T_B$. At the timing $T_B$, the AF evaluation values are compared with each other. The focus lens is moved in a forward direction in the case of A<B, and in a backward direction in the case of A>B.

When directions continuously determined to be in-focus directions by a predetermined number of times are the same (YES in step S309), the processing proceeds to step S310. Otherwise (NO in step S309), the processing proceeds to step S311. When the focus lens is repeatedly reciprocated within a predetermined range by a predetermined number of times (YES in step S311), the processing proceeds to step S312. Otherwise (NO in step S311), the processing is ended in step S313. As a result, the processing returns to the microdriving operation of step S202 illustrated in FIG. 2.

In step S310, the direction has been determined, and the processing is ended in step S313. Then, the processing proceeds to the hill-climbing driving of step S205 illustrated in FIG. 2. In step S312, the in-focus state has been determined, and the processing is ended. Then, the processing proceeds to the restarting determination routine of step S210 and after illustrated in FIG. 2.

Figure 5:
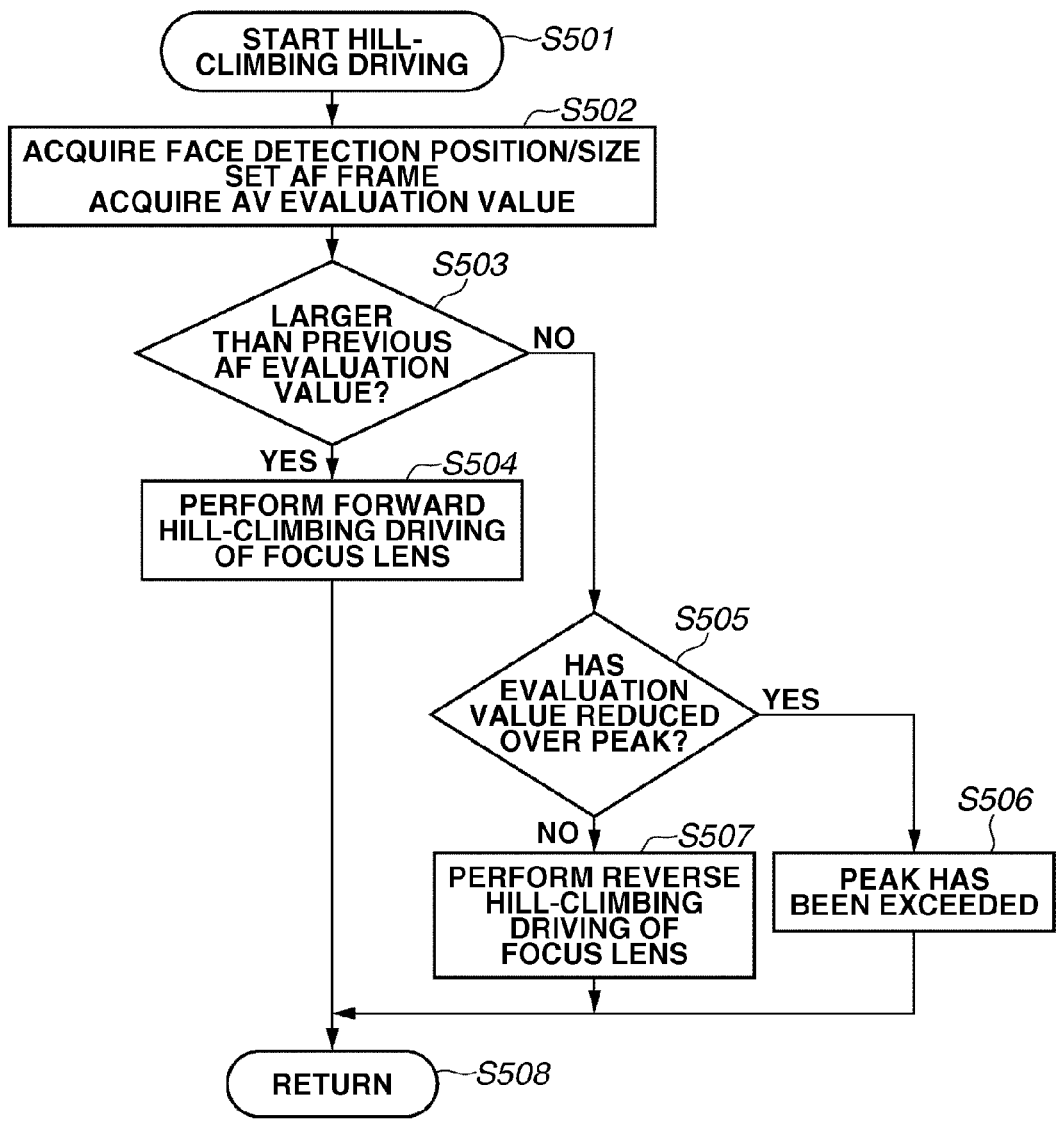
FIG. 5 is a flowchart illustrating a hill-climbing operation according to an exemplary embodiment of the present invention.

Next, referring to FIG. 5, the hill-climbing driving operation will be described. In step S501, the camera-AF microcomputer 114 starts the processing. In step S502, the camera-AF microcomputer 114 acquires a latest face detection position and size, and sets an AF frame (focus detection area) based on its information to acquire an AF evaluation value.

When the AF evaluation value acquired in step S502 is larger than a previous AF evaluation value (YES in step S503), the processing proceeds to step S504. When the AF evaluation value acquired in step S502 is smaller than the previous AF evaluation value (NO in step S503), the processing proceeds to step S505. In step S504, the camera-AF microcomputer 114 drives the focus lens in a previous forward direction at a predetermined speed. Then, in step S508, the processing is ended.

On the other hand, when it is determined that the AF evaluation value has decreased over a peak (YES in step S505), the processing proceeds to step S506. Then, in step S508, the processing is ended. Then, the processing proceeds through step S206 illustrated in FIG. 2 to execute the microdriving of step S202. When it is determined that the AF evaluation value has not decreased over the peak (NO in step S505), the processing proceeds to step S507. The camera-AF microcomputer 114 drives the focus lens in a direction opposite the previous direction at a predetermined speed. Then, the processing proceeds to step S508.

Figure 6:
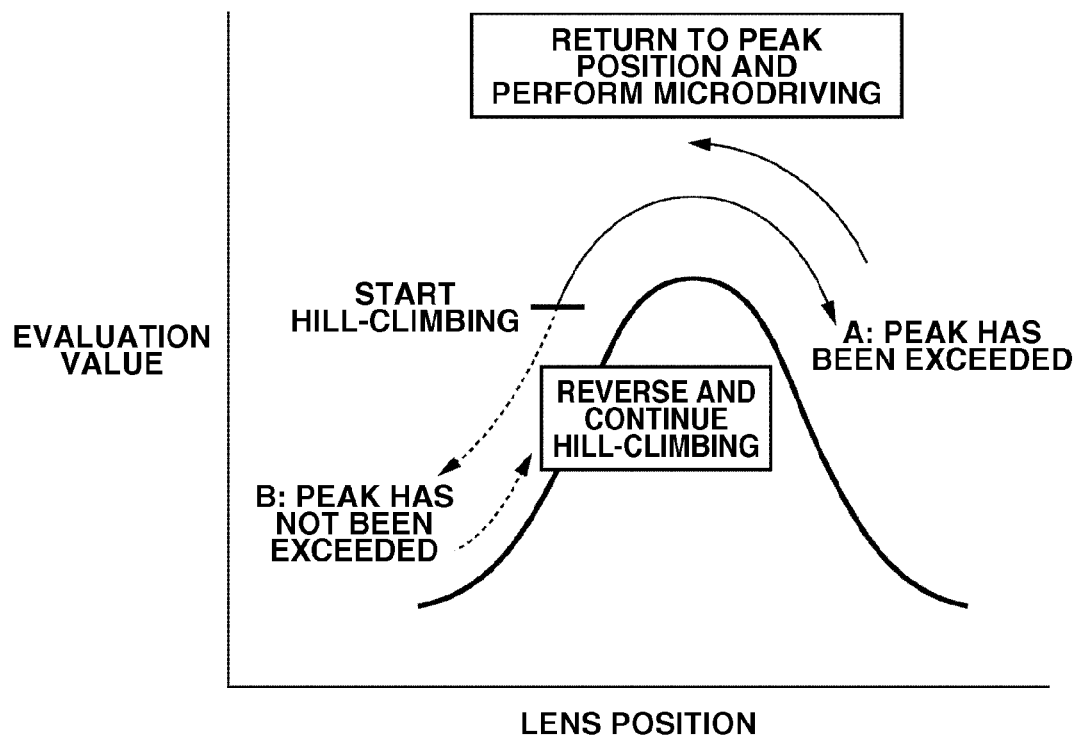
FIG. 6 illustrates the hill-climbing operation according to an exemplary embodiment of the present invention.

FIG. 6 illustrates the lens operation. In the case of A, the AF evaluation value has decreased over the peak. Accordingly, the hill-climbing operation is ended determining that there is an in-focus point, and the processing proceeds to the microdriving operation. On the other hand, in the case of B, the AF evaluation value has decreased without any peak. Accordingly, the lens operation is reversed determining that a direction has been wrong, and the hill-climbing operation is continued.

A moving amount per a certain time period, namely, a driving speed, is higher in value than that of the microdriving. When the detected face size continuously increases, AF responsiveness can be improved by setting a speed of hill-climbing driving higher.

As described above, the camera-AF microcomputer 114 performs control so that it can move the focus lens to increase the AF evaluation value by repeating restarting determination→microdriving→hill-climbing driving→microdriving→restarting.

Next, referring to FIGS. 7 to 13, movement determination processing of the object in the near or far direction that is a feature of the present invention will be described. First, referring to FIG. 7, the movement determination processing of step S303 illustrated in FIG. 3 will be described.

In step S701, the camera-AF microcomputer 114 starts the movement determination processing. In step S702, the camera-AF microcomputer 114 calculates an average of detected face sizes. The camera-AF microcomputer 114 stores the detected face sizes in its memory, and calculates an average of every ten stored sizes by a movement averaging method. The averaged face size is stored in FaceAveSize. This FaceAveSize has twenty arrays, and calculated average values are stored in FaceAveSizes [0] to [19]. In this case, a latest average value is stored in the FaceAveSize [0].

In step S703, the camera-AF microcomputer 114 determines presence of a movement determination flag. When the movement determination flag determined in processing described below has been set (YES in step S703), the processing proceeds to step S704. Otherwise (NO in step S703), the processing proceeds to step S707. In step S707, the camera-AF microcomputer 114 determines whether the average face size FaceAveSize calculated in step S702 is a stable value. This processing will be described in detail referring to FIG. 8. In step S708, the camera-AF microcomputer 114 determines a stability flag determined in step S707. When the stability flag has been set (YES in step S708), the processing proceeds to step S709. Otherwise (NO in step S708), the processing proceeds to step S720 to be ended.

When the stability flag is "CLEAR", the state of the object is not stable, and thus movement determination cannot be executed. In this case, the processing proceeds through step S304 illustrated in FIG. 3 to step S306 and after.

In step S709, the camera-AF microcomputer 114 determines whether a reference face size has been set. A reference face size FaceBaseSize is a face size that is a reference for movement determination. When the reference face size FaceBaseSize is 0, no value has been set (NO in step S709), and the processing proceeds to step S719. In step S719, the camera-AF microcomputer 114 substitutes the FaceBaseSize with the FaceAveSize [0]. As in the previous case, the processing proceeds through step S304 illustrated in FIG. 3 to step S306 and after.

When the reference face size FaceBaseSize is not 0 (YES in step S709), the processing proceeds to step S710. In step S710, the camera-AF microcomputer 114 executes movement determination threshold value setting processing. This processing is for setting a threshold value of a face size change used for the movement determination according to an imaging parameter or the state of the object. The processing will be described in detail below referring to FIG. 9.

Then, in step S711, the camera-AF microcomputer 114 compares the current face size FaceAveSize [0] with the reference face size FaceBaseSize. When the current face size is smaller (YES in step S711), there is a possibility of moving-away and the processing accordingly proceeds to step S712. Otherwise (NO in step S711), there is a possibility of "approaching" and the processing proceeds to step S713.

In step S712, the camera-AF microcomputer 114 determines moving-away. When a difference between the reference face size FaceBaseSize and the current face size FaceAveSize [0] is equal to or more than THfar (YES in step S712), the camera-AF microcomputer 114 determines that the object has moved away, and the processing proceeds to step S717. Otherwise (NO in step S712), the processing proceeds to step S714. In step S717, the camera-AF microcomputer 114 sets an away flag of the movement determination flag meaning that the object has moved away. Then, the processing proceeds to step S720 to be ended.

Figure 3:
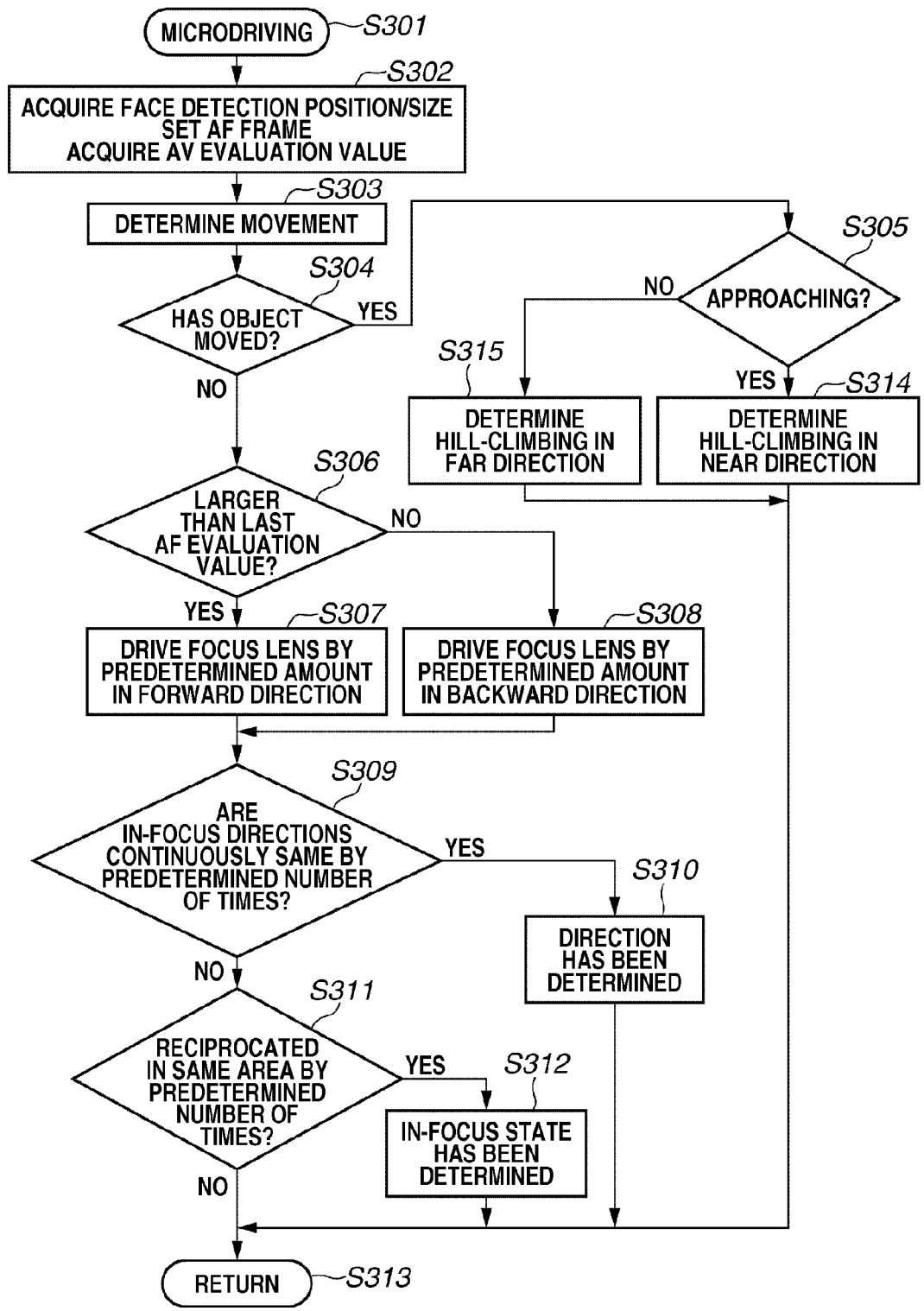
FIG. 3 is flowchart illustrating a microdriving operation according to an exemplary embodiment of the present invention.

In this case, the processing proceeds through step S304 illustrated in FIG. 3 to step S305 and after. In step S713, the camera-AF microcomputer 114 determines "approaching". When a difference between the reference face size FaceBaseSize and the current face size FaceAveSize [0] is equal to or more than THnear (YES in step S713), the camera-AF microcomputer 114 determines that the object has approached, and the processing proceeds to step S718. Otherwise (NO in step S713), the processing proceeds to step S714. In step S718, the camera-AF microcomputer 114 sets an approaching flag of the movement determination flag meaning that the object has approached. Then, the processing proceeds to step S720 to be ended. As in the previous case, the processing proceeds through step S304 illustrated in FIG. 3 to step S305 and after.

In step S714, the camera-AF microcomputer 114 increments a timer FaceJudgetime for determining how many times movement determination is repeated when the reference face size is set and in a stable state, and the processing proceeds to step S715. In step S715, the camera-AF microcomputer 114 determines whether the FaceJudgetimer is equal to or lower than Timer TH.

This processing is carried out to initialize the determination processing even when a state where the movement determination is continued for about 2 seconds. Thus, a value 120 corresponding to 2 seconds is set to the Timer TH, and the camera-AF microcomputer 114 determines whether this value of FaceJudgeTimer exceeds the Timer TH (i.e., 2 seconds). In the present exemplary embodiment, a system for executing processing 60 times per second is assumed, and a value corresponding to 2 seconds is accordingly 120.

When the FaceJudgetimer exceeds the Timer TH (YES in step S715), the processing proceeds to step S716 to execute initialization processing. Otherwise (NO in step S715), the processing proceeds to step S720 to be ended. In this case, the processing returns to step S702 to continue the movement determination. In step S716, the camera-AF microcomputer 114 initializes the FaceJudgetimer to 0, and then the processing proceeds to step S705.

In step S705, the camera-AF microcomputer 114 initializes the FaceBaseSize to 0, and the processing proceeds to step S706. In step S706, the camera-AF microcomputer 114 clears the movement determination flag to execute initialization. After the end of the initialization processing, the processing proceeds to step S720 to be ended. In this case, the processing proceeds through step S304 illustrated in FIG. 3 to step S306 and after.

When it is determined that the movement determination flag has been set (YES in step S703), the processing proceeds to step S704 to determine whether the movement of the object has ended. In step S704, the camera-AF microcomputer 114 executes FaceAveSize comparison to determine the end of the movement. To acquire a difference between the current FaceAveSize [0] and the previous FaceAveSize [1], the camera-AF microcomputer 114 calculates FaceAveSizeDiff=FaceAveSize [0]−FaceAveSize [1], and then the processing proceeds to step S704'.

In step S704', the camera-AF microcomputer 114 determines, in the case of approaching of the object, the end of the movement when a face size is smaller (negative value of FaceAveSizeDiff). In the case of moving-away of the object, the camera-AF microcomputer 114 determines the end of the movement when a face size is larger (positive value of FaceAveSizeDiff). When it is determined that the movement of the object has ended (YES in step S704'), the processing proceeds to step S705 to execute initialization processing. Otherwise (NO in step S704'), the processing proceeds to step S720 to be ended. In this case, the processing returns to step S702 to continue the movement determination.

Figure 8:
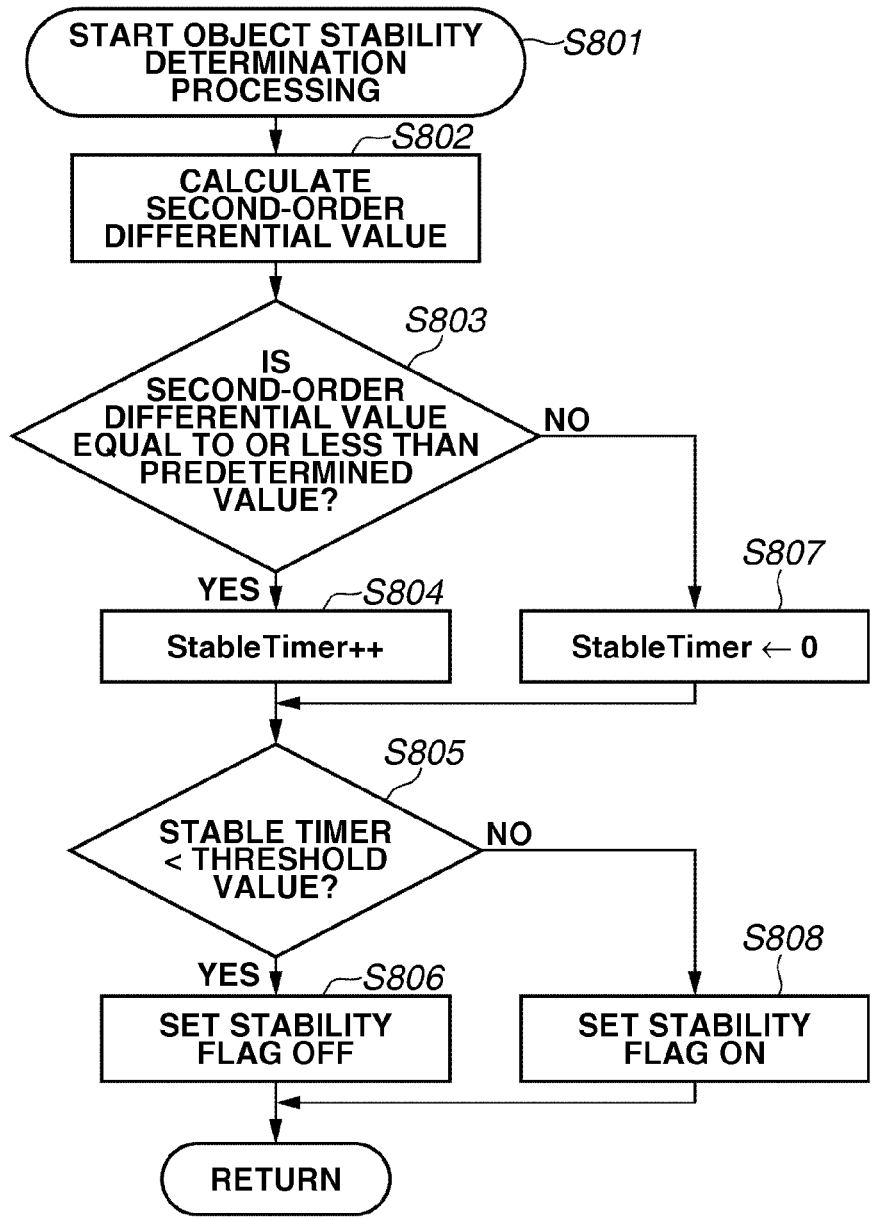
FIG. 8 is a flowchart illustrating stability determination processing according to an exemplary embodiment of the present invention.

Referring to FIG. 8, the object stability determination processing of step S707 illustrated in FIG. 7 will be described. In step S801, the camera-AF microcomputer 114 starts the processing. In step S802, the camera-AF microcomputer 114 calculates a second-order differential value of the average face size. Hereinafter, a specific calculation method of the second-order differential value will be described.

First, the camera-AF microcomputer 114 calculates a first-order differential value by calculating a difference between the average face size calculated in step S702 illustrated in FIG. 7 and an average face size calculated the predetermined time before, and records its result in the memory. Then, the camera-AF microcomputer 114 calculates a second-order differential value by calculating a changing amount between the first-order differential value recorded in the memory and a first-order differential value calculated the predetermined time before to be recorded in the memory. The calculated second-order differential value indicates how much the currently calculated first-order differential value of the average face size has changed from the first-order differential value of the average face size calculated the predetermined time before.

Then, in step S803, the camera-AF microcomputer 114 determines whether the second-order differential value calculated in step S802 is equal to or lower than a threshold value. When the calculated second-order differential value is equal to or lower than the threshold value (YES in step S803), the camera-AF microcomputer 114 determines that the object is stable because the changing amount of the currently calculated first-order differential value of the average face size from the first-order differential value of the average face size calculated the predetermined time before is small, and the processing proceeds to step S804. On the other hand, when the calculated second-order differential value is higher than the threshold value (NO in step S803), the camera-AF microcomputer 114 determines that the object is not stable because the changing amount of the currently calculated first-order differential value of the average face size from the first-order differential value of the average face size calculated the predetermined time before is large, and the processing proceeds to step S807.

In the present exemplary embodiment, it is empirically determined that the threshold value is 10% of the average face size. It is further determined that the predetermined time before is 15 frames before, which enables determination of whether the second-order differential value is stable by the threshold value. However, in the present exemplary embodiment, the set threshold value and the set predetermined time can be freely changed by the system.

Then, in step S804, the camera-AF microcomputer 114 counts up StableTimer, and the processing proceeds to step S805. The StableTimer is a variable for counting a period during which the calculated average size is continuously stable. Accordingly, an average face size after the StableTimer has exceeded a predetermined period (hereinafter, StableTH) can be determined to be stable.

In the present exemplary embodiment, the StableTimer is 15 frames. Since the StableTH is a variable for counting the period during which the calculated average size is continuously stable, it must be a period equal to or shorter than the predetermined period (15 frames in the present exemplary embodiment) used for calculating the second-order differential value. In step 807, since the second differential value of the average face size is larger than the threshold value, the camera-AF microcomputer 114 clears the StableTimer (set to 0 in the present exemplary embodiment).

Then, in step S805, the camera-AF microcomputer 114 determines whether the StableTimer is lower than the StableTH. When it is determined to be lower (YES in step S805), the processing proceeds to step S806. When the StableTimer is equal to or higher than the StableTH (NO in step S805), the processing proceeds to step S808. In step S806, the camera-AF microcomputer 114 determines that the average face size calculated in step S702 is not continuously stable until the StableTimer exceeds the StableTH, and sets the stability flag off to end the processing illustrated in FIG. 8.

On the other hand, in step S808, the camera-AF microcomputer 114 determines that the average face size calculated in step S702 is continuously stable while it is equal to or higher than the StableTH, and sets the stability flag on to end the processing illustrated in FIG. 8.

In the processing illustrated in FIG. 8, the camera-AF microcomputer 114 determines whether the object is stable based on the average face size. In addition, a method for calculating a second-order differential value concerning a position of the face or the human body to determine whether the object is stable may be employed.

In the case of a system capable of detecting eyes or a mouth, a method for calculating a second-order differential value concerning an interval between the eyes (or eye and mouth) to determine whether the object is stable may be employed. Further, a method for calculating a ratio of an interval between the eye and the mouth to the interval between the eyes and calculating a second-order differential value concerning the calculated ratio to determine whether the object is stable may be employed.

In short, any shape information of the object such as information about a size of a predetermined portion, information about a plurality of portions, or relative information about a ratio between a plurality of sizes and a distance can be employed as long as the information enables determination of stability of predetermined motion of the object.

Figure 9:
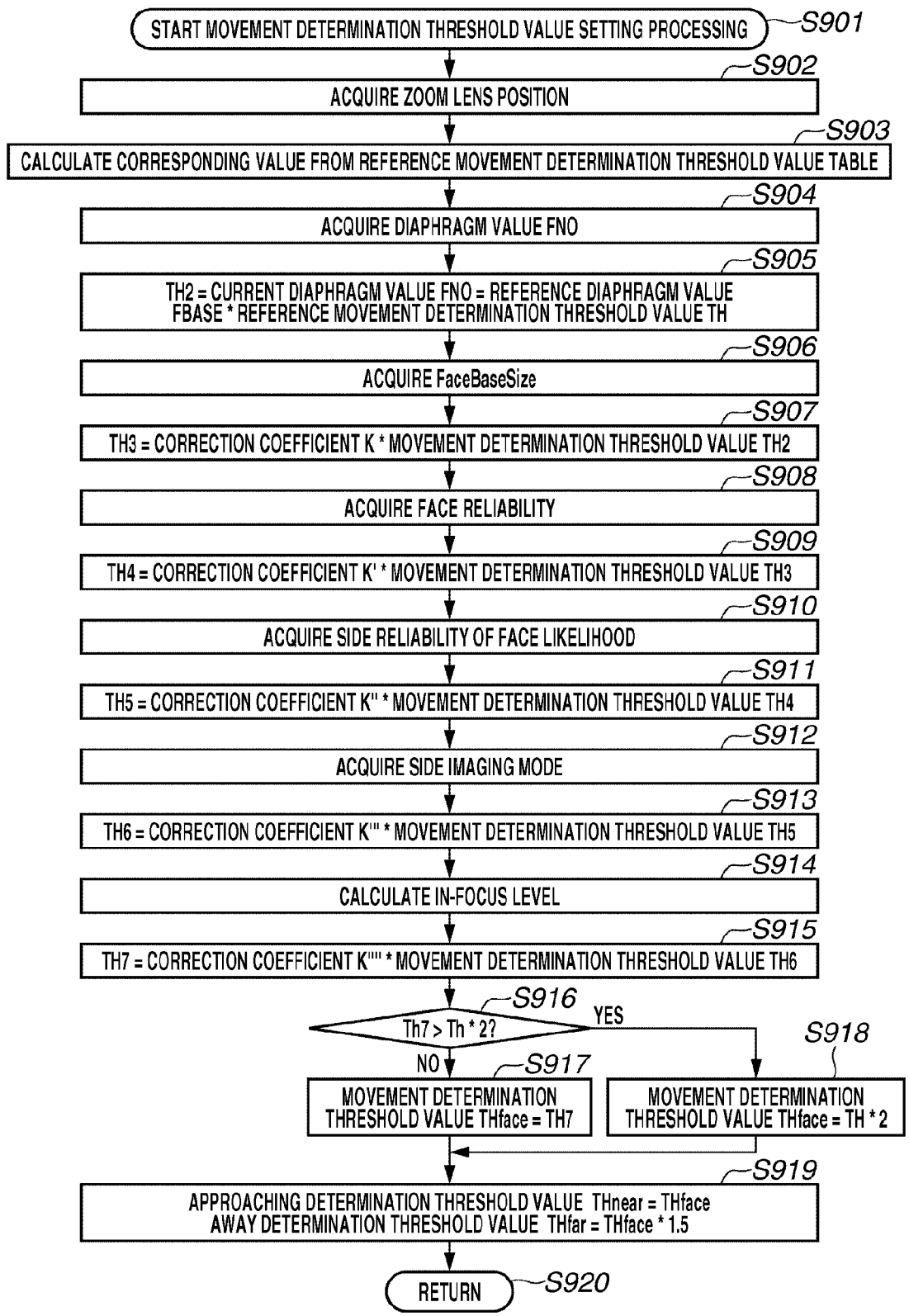
FIG. 9 is a flowchart illustrating processing of movement determination threshold value setting according to an exemplary embodiment of the present invention.

Next, referring to FIG. 9, the movement determination threshold value setting processing in step S710 illustrated in FIG. 7 will be described. In step S901, the camera-AF microcomputer 114 starts the processing. In step S902, the camera-AF microcomputer 114 acquires a lens position of the zoom lens 102. When a driving source of the zoom lens is a stepping motor, the number of steps is used for determining which of a telephoto side or a wide side the lens is located on.

Figure 10:
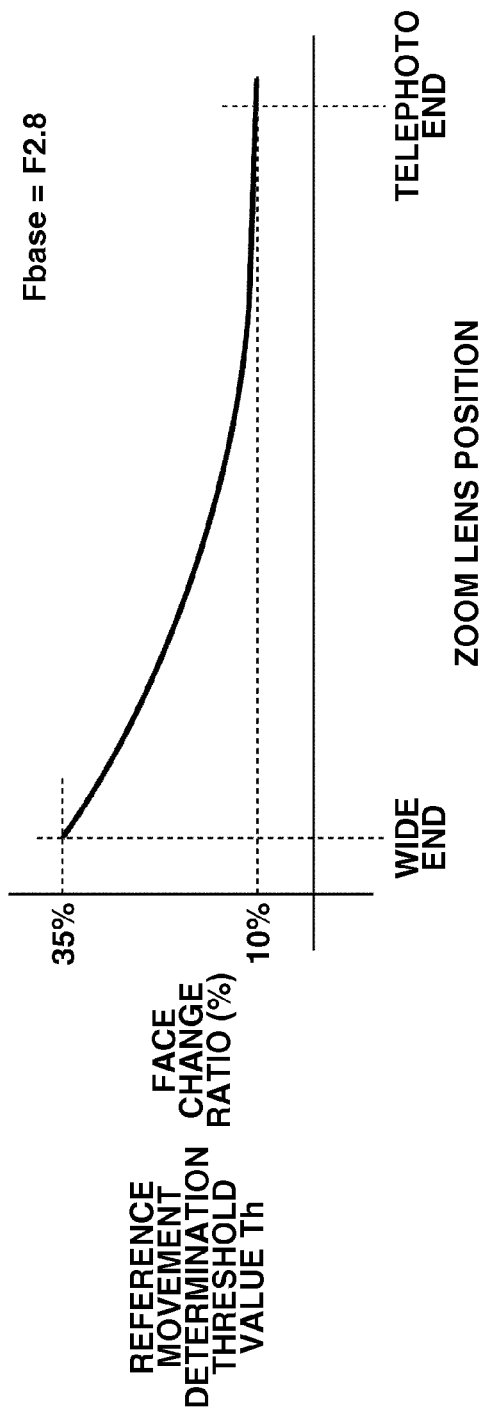
FIG. 10 illustrates a threshold value based on a zoom lens position according to an exemplary embodiment of the present invention.

In step S903, the camera-AF microcomputer 114 acquires a reference movement determination threshold value Th according to a current zoom position from a relationship graph of the zoom lens position and the reference movement determination threshold value Th illustrated in FIG. 10. In FIG. 10, a vertical axis indicates a ratio (%) of a change of the face size, and a horizontal axis indicates the zoom lens position. The relationship illustrated in the graph has been calculated from a relationship between a front edge of a depth of field and a changing amount of the face size at each zoom lens position in a state where a diaphragm value Fbase is constant.

When a predetermined object in an in-focus state moves, blur is started to be recognized on the screen from a point of time exceeding the depth of field, and accordingly the reference movement determination threshold value is set to a value smaller than the depth of field. This enables, before the object starts blurring, driving of the focus lens by determining presence of movement. Thus, performance of following the object can be improved. When a real reference movement determination threshold value Th is calculated, the camera-AF microcomputer 114 has a table of reference movement determination threshold values Th according to the respective zoom positions, and determines a threshold value corresponding to the zoom lens position.

The depth of field is calculated by using the following expressions (1a and 1b), where s is a distance of the object, and Dn and Df are respectively front and rear edges of the depth of field:

$$Dn=S(H-f)/(H+s-2f) \quad (1a)$$

$$Df=s(H-f)/(H-s) \quad (1b)$$

A hyper-focal distance H is calculated by the following expression (2), where f is a lens focal distance, N is a lens diaphragm value, and c is a diameter of a permitted circle of confusion:

$$H=f*f/N*c \quad (2)$$

Then, in step S904, the camera-AF microcomputer 114 acquires a current diaphragm value Fno. For the diaphragm value, the camera-AF microcomputer 114 acquires an F value from a driving amount of the diaphragm 103. In step S905, the camera-AF microcomputer 114 corrects the reference movement determination threshold value according to the diaphragm. Since the depth of field changes according to the diaphragm value, the camera-AF microcomputer 114 compares the acquired current diaphragm value Fno with the diaphragm value Fbase when the reference movement determination movement value illustrated in FIG. 10 is calculated. The camera-AF microcomputer 114 calculates a corrected movement determination threshold value Th2 based on the following expression (3):

$$Th2=(\text{current diaphragm value } Fno/\text{reference diaphragm value } Fbase)*\text{reference movement determination threshold value Th} \quad (3)$$

Thus, the threshold value or the predetermined amount is determined based on the depth of field, and set to an amount smaller than the changing amount of the object image when the object moves by an amount equal to the depth of field.

Then, in step S906, the camera-AF microcomputer 114 acquires a reference face size FaceBaseSize. In step S907, the camera-AF microcomputer 114 corrects the reference movement determination threshold value according to the reference face size FaceBaseSize.

Figure 11:
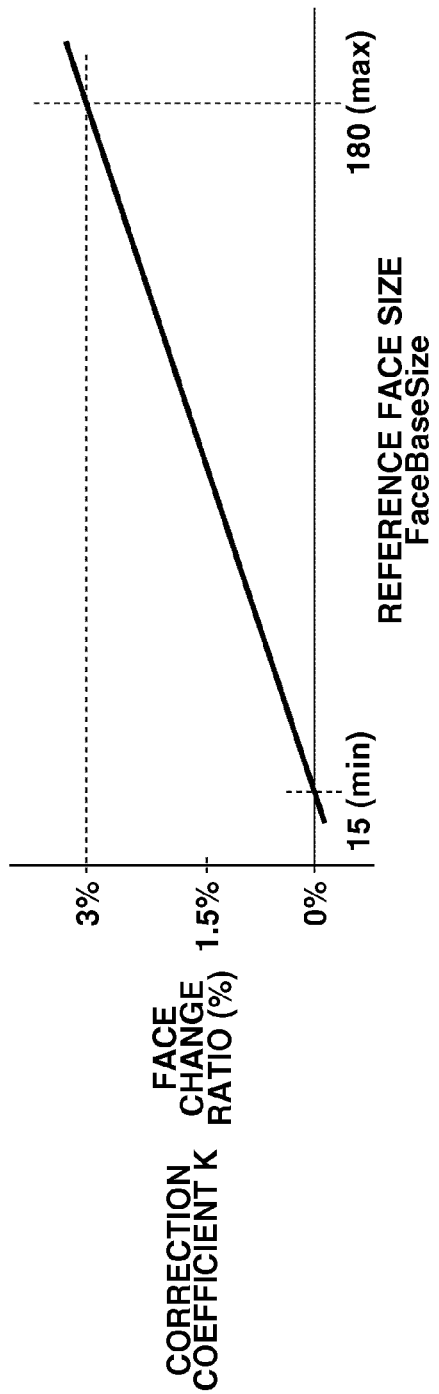
FIG. 11 illustrates a correction coefficient K based on a reference face size according to an exemplary embodiment of the present invention.

FIG. 11 is a graph illustrating a relationship between the reference face size and a correction coefficient K. A vertical axis indicates a ratio (%) of a change of the face size, and a horizontal axis indicates the reference face size. When the reference face size FaceBaseSize increases, the change on detected face sizes is increased. Thus, correction is necessary. By the graph of the acquired reference face size and the correction coefficient K, the camera-AF microcomputer 114 calculates a corrected movement determination threshold value Th3 based on the following expression (4):

$$Th3=\text{correction coefficient } K*\text{movement determination threshold value Th2} \quad (4)$$

Thus, the object status is the size of the object image detected by the detection unit, and the threshold value or the predetermined amount is changed according to the size of the object image and a difference from the reference value of the size of the object image.

Then, in step S908, the camera-AF microcomputer 114 acquires face reliability from a signal of the face detection unit 116. As described above, the face reliability is evaluated by five grades of 1 to 5, where 5 is highest and 1 is lowest.

In step S909, the camera-AF microcomputer 114 corrects the movement determination threshold value by using the face reliability. When reliability is low, variation on detected face sizes may be large, and detection may be erroneous even when variation is small. Thus, the threshold value must be corrected to be set high.

In the present exemplary embodiment, when face reliability is 3 or lower, the camera-AF microcomputer 114 sets 1.5 set to the correction coefficient K', and calculates a corrected movement determination threshold value Th4 based on the following expression (5) by using the acquired face reliability:

$$Th4 = \text{correction coefficient } K''' * \text{movement determination threshold value Th3} \qquad (5)$$

Thus, the object status is reliability indicating likelihood of the face detected by the detection unit, and the threshold value or the predetermined amount is changed according to the reliability indicating likelihood of the face, and changed to a large amount when the reliability is low.

Then, in step S910, the camera-AF microcomputer 114 acquires side face reliability from a signal of the face detection unit 116. As described above referring to FIG. 13, the side face reliability is evaluated at five grades of 1 to 5, where 5 represents a highest side face likelihood and 1 represents lowest.

In step S911, the camera-AF microcomputer 114 corrects the movement determination threshold value by using the side face likelihood reliability. When side face reliability is high, variation of detected face sizes may be large, and detection may be erroneous even when variation is small. Thus, the threshold value must be corrected to be set high. In the present exemplary embodiment, when side face reliability is 3 or higher, the camera-AF microcomputer 114 sets 1.5 in the correction coefficient K'', and calculates a corrected movement determination threshold value Th5 based on the following expression (6) by using the acquired side face likelihood reliability:

$$Th5 = \text{correction coefficient } K'' * \text{movement determination threshold value Th4} \qquad (6)$$

Thus, the object status is reliability indicating whether the face detected by the detection unit is turned away, and the threshold value or the predetermined amount is changed according to the reliability indicating the sideway direction of the face, and changed to a large amount when the reliability is high.

Then, in step S912, the camera-AF microcomputer 114 acquires an imaging mode from information therein. A general imaging apparatus has a plurality of imaging modes illustrated in FIG. 12 to set imaging parameters optimal to imaging scenes. In step S913, the camera-AF microcomputer 114 corrects the movement determination threshold value according to the imaging mode. FIG. 12 is a table illustrating a relationship between the imaging mode and a correction coefficient K'''.

In the imaging mode where much movement of the object is expected, the camera-AF microcomputer 114 sets the correction coefficient K''' to 1 or lower to set a threshold value low, thereby improving AF responsiveness. In the imaging mode where less movement of the object is expected, the camera-AF microcomputer 114 sets the correction coefficient K''' high to set a threshold value of movement determination high, thus attaching importance to AF stability. The camera-AF microcomputer 114 calculates a corrected movement determination threshold value Th6 based on the following expression (7) based on the acquired imaging mode and the correction coefficient K''' determined from FIG. 12:

$$Th6 = \text{correction coefficient } K''' * \text{movement determination threshold value Th5} \qquad (7)$$

Thus, the imaging parameter represents an imaging mode, and the threshold value or the predetermined amount is changed according to the imaging mode. The threshold value or the predetermined amount is changed to a large amount when an imaging mode for imaging an object including much movement is set, and to a small amount when an imaging mode for imaging an object of less movements is set.

Then, in step S914, the camera-AF microcomputer 114 acquires an in-focus level. The in-focus level is calculated by the following method. That is, a peak hold value of an AF evaluation value within an evaluation frame is divided by a difference between a maximum value and a minimum value of a luminance level of each line. The in-focus levels are represented by 0 and 1. In the case of an object in an in-focus state, the peak hold value of the AF evaluation value and the difference between the luminance levels tend to be equal, and accordingly the in-focus level approaches 1.

In a case of an object of a low in-focus level, a possibility of blurring is high, and reliability of the face size may drop. Thus, the camera-AF microcomputer 114 sets the movement determination threshold value high. For example, the camera-AF microcomputer 114 sets a correction coefficient K'''' to 1.5 when the in-focus level is 0.5 or lower by using the acquired in-focus level, and calculates a corrected movement determination threshold value Th7 based on the following expression (8):

$$Th7 = \text{correction coefficient } K'''' * \text{movement determination threshold value Th6} \qquad (8)$$

Thus, the imaging parameter represents an in-focus level estimated from a state of a level of the AF evaluation value and a driving state of the focus lens, and the threshold value or the predetermined amount is changed according to the in-focus level, and changed to a large amount when the in-focus level is low. The correction coefficients K', K'', K''', and K'''' are not limited to these. They can be determined by carrying out sufficient measurement according to the camera.

Then, in step S916, the camera-AF microcomputer 114 sets a limit on the movement determination threshold value Th7 calculated in step S915. In the case of the above correction method, due to repeated corrections, the movement determination threshold value may be several times larger than the reference movement determination threshold value, and thus may not be appropriate as a threshold value for movement determination. Thus, an upper limit of the threshold value is set.

When the movement determination threshold value Th7 is larger than twice the reference movement determination threshold value Th (YES in step S916), the processing proceeds to step S918. Otherwise (NO in step S916), the processing proceeds to step S917. In the present exemplary embodiment, the movement determination threshold value is limited to a value twice as large as the movement determination threshold value Th7 to maintain movement determination accuracy. For this value, a value where sufficient measurement is carried out to reduce erroneous determination can arbitrarily be set.

In step S917, the camera-AF microcomputer 114 substitutes a movement determination threshold value THface with Th7, and the processing proceeds to step S919. In step S918, since the movement determination threshold value is excessively large, the camera-AF microcomputer 114 sets a limit on the threshold value. The camera-AF microcomputer 114 finally substitutes the movement determination threshold value THface with a value twice as large as the reference movement determination threshold value Th, and the processing proceeds to step S919.

In step S919, the camera-AF microcomputer 114 changes the threshold value for moving-away determination and approaching determination based on the movement determination threshold value THface. For face detection, there is a method for determining a face size based on an interval between the eyes. When the human turns one's face away, the interval between the eyes is reduced. Thus, even when there is no change in distance to the object, the detected face size is determined to be smaller. As a result, moving-away detection of the object may be executed by mistake.

Thus, by setting the moving-away detection threshold value THfar larger than the approaching detection threshold value THnear, erroneous determination caused by a erroneous size change due to side face imaging, is reduced. In the present exemplary embodiment, the moving-away detection threshold value is set 1.5 times larger. For this value, a value where sufficient measurement is carried out to reduce erroneous determination is set.

Thus, the object status is a result of the above determination. The threshold value or the predetermined amount is set different according to when the determination result is moving-away and when the determination result is approaching. A larger amount is set in the case of moving-away than in the case of approaching.

The processing flow of the movement determination threshold value setting has been described above, which is for calculating the approaching detection threshold value THnear and the moving-away detection value THfar. The coefficients and the expressions used in the processing are only examples, and thus in no way limitative. For the threshold value change, not all the changes need to be included, but at least one change may be included.

As described above, in the present exemplary embodiment, focusing on the human object is performed based on the AF evaluation value by using the face detection. Simultaneously, the determination unit monitors a change in size of the face, and changes the movement determination threshold value according to the imaging parameter or the object status. Thus, highly accurate and stable object movement determination can be carried out.

Then, by using the information, when the predetermined changing amount of size of the object image is larger than the threshold value or the predetermined amount, focusing is driven to follow the movement of the object to the far or near side. As a result, focusing accuracy can be improved.

For the processing in the exemplary embodiment, a storage medium storing program codes of software incorporating the functions can be provided to the system or the apparatus. Then, a computer (central processing unit (CPU) or microprocessor unit (MPU)) reads and executes the program codes stored in the storage medium to realize the functions of the exemplary embodiment. In this case, the program codes read from the storage medium themselves realize the functions of the exemplary embodiments, and the storage medium storing the program codes is within the scope of the present invention.

The storage medium for supplying such program codes includes, for example, a floppy (registered trademark) disk, a hard disk, an optical disk, or a magneto-optical disk. Alternatively, a compact disk (CD)-random access memory (ROM), a CD-recordable (R), a magnetic tape, a nonvolatile memory card, or a ROM can be used. The functions of the exemplary embodiment are not necessarily realized by only executing the program codes read by the computer. Based on instructions of the program codes, an operating system (OS) operating on the computer may execute a part or all of actual processing, and the functions of the exemplary embodiment may be realized by the processing. This is also within the scope of the present invention.

Further, the program codes read from the storage medium can be written in a memory included in a function extension board inserted into the computer or a function extension unit connected to the computer. Then, based on the instructions of the program codes, a CPU included in the function extension board or the function extension unit executes a part or all of actual processing, and the functions of the exemplary embodiment are realized by the processing. This is also within the scope of the present invention.

The exemplary embodiment of the present invention has been described above. However, the present invention is not limited to the exemplary embodiment. Various changes and modifications can be made within the scope and the spirit of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2011-227515 filed Oct. 16, 2011 and No. 2011-232334 filed Oct. 23, 2011, and No. 2011-232335 filed Oct. 23, 2011, which are hereby incorporated by reference herein in their entirety.

What is claimed is:

1. A focus position control apparatus comprising:
a processor;
the processor is configured to detect a changing amount of a detected size of an object image, wherein the object image is acquired at a shooting parameter; and
a controller configured by the processor to switch a first control and a second control based on whether the changing amount is larger than a predetermined amount or not,
wherein the first control is for controlling a focus position corresponding to a change in size of the object image, and the second control is a control different from the first control, and
wherein the controller changes the predetermined amount based on the shooting parameter.

2. The focus position control apparatus according to claim 1, wherein, in a case where the processor detects that steepness of the change in detected size or position of the object image is continuously lower than a threshold value for a predetermined time period, the controller is configured by the processor to set the first control.

3. The focus position control apparatus according to claim 1, wherein the processor is configured to calculate a difference in, among sizes or positions of object images determined to be stable by an object stability determination unit, sizes or positions of the object images detected at a time interval, and determine presence of a distance change of the object.

4. The focus position control apparatus according to claim 1, wherein:
   an object information storage unit is configured by the processor stores the detected size or position of the object image;
   the processor is configured to calculate a first difference value between a latest detected size or position of the object image and the size or position of the object image stored in the object information storage unit at a certain time interval; and
   a difference storage unit is configured to store the first difference value,
   wherein the changing amount of the size of the object image is a changing amount between a latest difference value stored in the difference storage unit and the first difference value stored before the time interval.

5. The focus position control apparatus according to claim 1, wherein the size of the object image is a size of a portion of a human face or body acquired by the processor.

6. The focus position control apparatus according claim 1, wherein the size of the object image is a distance between at least two organs arranged in the human face acquired by the processor.

7. The focus position control apparatus according to claim 2, wherein the position of the object image is a position of a portion of a human face or body acquired by the processor.

8. The focus position control apparatus according to claim 1, wherein the second control is for a microdriving operation of the focus position.

9. A focus position control apparatus comprising:
   a processor;
   the processor is configured to detect a size of an object image; and
   a controller configured by the processor to execute a first control when a changing amount of the size of the object image over several frames corresponds to a first case, and a second control for microdriving a focus position irrespective of a change in size of the object image when the changing amount of the size of the object image over several frames corresponds to a second case,
   wherein the first control is for controlling the focus position corresponding to the change when the change in the detected size of the object image corresponds to a third case, and executing control for microdriving the focus position in a fourth case where the change in the detected size of the object image is smaller than that in the third case.

10. The focus position control apparatus according to claim 9, wherein the changing amount of the size of the object image over several frames is steeper in the first case than in the second case.

11. The focus position control apparatus according to claim 9, wherein the size of the object image corresponds to a size of the face.

12. A method for controlling a focus position control apparatus, comprising:
   performing a first detection of a changing amount of a detected size of an object image;
   performing a second detection of a changing amount of the detected size of the object image; and
   switching a first control and a second control based on a detection result of the changing amount of the size of the object image by the second detection when the changing amount of the size of the object image detected by the first detection corresponds to a first case,
   wherein the first control is for controlling a focus position corresponding to a change in size of the object image, and the second control is for microdriving the focus position.

13. A method for controlling a focus position control apparatus, comprising:
   detecting a size of an object image; and
   executing a first control when a changing amount of the size of the object image over several frames corresponds to a first case, and a second control for microdriving a focus position irrespective of a change in size of the object image when the changing amount of the size of the object image over several frames corresponds to a second case,
   wherein the first control is for controlling the focus position corresponding to the change when the change in the detected size of the object image corresponds to a third case, and executing control for microdriving the focus position in a fourth case where the change in the detected size of the object image is smaller than that in the third case.

* * * * *